US012217681B2

(12) United States Patent
Kim et al.

(10) Patent No.: US 12,217,681 B2
(45) Date of Patent: Feb. 4, 2025

(54) DISPLAY DEVICE INCLUDING COMPENSATION FOR CURRENT DIFFERENCE BETWEEN CIRCUIT BOARDS, AND METHOD OF DRIVING THE SAME

(71) Applicant: LG Display Co., Ltd., Seoul (KR)

(72) Inventors: Dong Ju Kim, Paju-si (KR); Won Yong Jang, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/382,942

(22) Filed: Oct. 23, 2023

(65) Prior Publication Data

US 2024/0249681 A1 Jul. 25, 2024

(30) Foreign Application Priority Data

Jan. 25, 2023 (KR) ........................ 10-2023-0009407

(51) Int. Cl.
*G09G 3/3233* (2016.01)
*G09G 3/20* (2006.01)

(52) U.S. Cl.
CPC ......... *G09G 3/3233* (2013.01); *G09G 3/2096* (2013.01); *G09G 2320/02* (2013.01); *G09G 2330/08* (2013.01); *G09G 2330/12* (2013.01)

(58) Field of Classification Search
None
See application file for complete search history.

(56) References Cited

U.S. PATENT DOCUMENTS

2015/0289336 A1* 10/2015 Cho ........................ H05B 45/14 315/192
2016/0117988 A1* 4/2016 Lee ...................... G09G 3/3233 345/82
2017/0295615 A1* 10/2017 Manahan ............ H05B 45/397
2024/0078947 A1* 3/2024 Koh ....................... H05K 1/189

FOREIGN PATENT DOCUMENTS

CN 202059628 U * 11/2011
KR 101958449 B1 * 3/2019

* cited by examiner

*Primary Examiner* — Kirk W Hermann
(74) *Attorney, Agent, or Firm* — Birch, Stewart, Kolasch & Birch, LLP

(57) ABSTRACT

A display device includes a display panel configured to display images, a plurality of circuit boards connected to one side of the display panel, a cable electrically connecting at least two of the plurality of circuit boards, voltage lines disposed on the cable, the plurality of circuit boards, and the display panel, a deviation compensation circuit configured to sense voltages transmitted through a circuit board on one side and a circuit board on the other side connected by the cable among the plurality of circuit boards and to output a signal based on the sensed voltages, and a variable circuit configured to compensate for a current difference between the circuit board on one side and the circuit board on the other side based on the signal output from the deviation compensation circuit.

13 Claims, 15 Drawing Sheets

(1) Comparative example
(2) Compensation resistors are attached only to L2
(3) Compensation resistors are attached to L1+L2 and fine tuning is performed

DISPLAY DEVICE INCLUDING COMPENSATION FOR CURRENT DIFFERENCE BETWEEN CIRCUIT BOARDS, AND METHOD OF DRIVING THE SAME

CROSS-REFERENCE TO RELATED APPLICATIONS

This application claims priority to Korean Patent Application No. 10-2023-0009407, filed in the Republic of Korea on Jan. 25, 2023, the entire contents of which are hereby expressly incorporated by reference into the present application.

BACKGROUND

Field

The present disclosure relates to a display device and a method of driving the same.

Discussion of the Related Art

As information technology develops, the market for display devices, which are communication media between users and information, is growing. Accordingly, display devices such as a light emitting display (LED) device, a quantum dot display (QDD) device, and a liquid crystal display (LCD) device are increasingly used.

The display devices described above include a display panel including sub-pixels, a driver that outputs driving signals for driving the display panel, and a power supply that generates power to be supplied to the display panel or the driver.

In the above-described display devices, when driving signals, for example, a scan signal and a data signal, are supplied to the sub-pixels formed in the display panel, selected sub-pixels transmit light or directly emit light, thereby displaying an image.

SUMMARY OF THE DISCLOSURE

Accordingly, the present disclosure is directed to a display device and a method of driving the same that substantially obviate one or more problems due to limitations and disadvantages of the related art.

The present disclosure enhances display quality by compensating for or improving current deviations that can be caused by physical separation of voltage lines through which a voltage is transmitted to a display panel by a plurality of circuit boards or a plurality of cables.

Additional advantages, objects, and features of the disclosure will be set forth in part in the description which follows and in part will become apparent to those having ordinary skill in the art upon examination of the following or can be learned from practice of the disclosure. The objectives and other advantages of the disclosure can be realized and attained by the structure particularly pointed out in the written description and claims hereof as well as the appended drawings.

To achieve these objects and other advantages and in accordance with the purpose of the disclosure, as embodied and broadly described herein, a display device includes a display panel configured to display images, a plurality of circuit boards connected to one side of the display panel, a cable electrically connecting at least two of the plurality of circuit boards, voltage lines disposed on the cable, the plurality of circuit boards, and the display panel, a deviation compensation circuit configured to sense voltages transmitted through a circuit board on one side and a circuit board on the other side connected by the cable among the plurality of circuit boards and to output a signal based on the sensed voltages, and a variable circuit configured to compensate for a current difference between the circuit board on one side and the circuit board on the other side based on the signal output from the deviation compensation circuit.

The variable circuit can include at least one variable resistor configured to vary resistance values of the voltage lines based on the signal output from the deviation compensation circuit.

The variable circuit can include at least one transistor configured to vary an amount of current flowing through the voltage lines based on the signal output from the deviation compensation circuit.

The deviation compensation circuit can output a signal for controlling an on/off duty ratio of the at least one transistor.

The variable circuit can be disposed between voltage lines formed in a display area of the display panel.

The variable circuit can include at least one transistor configured to block a current flowing through the voltage lines formed in the display area of the display panel.

The deviation compensation circuit can output a signal for controlling on/off of the transistor.

The variable circuit can be disposed on at least one of the circuit board on one side and the circuit board on the other side.

The deviation compensation circuit can be disposed on one selected from the circuit board on one side, the circuit board on the other side, and the cable.

In another aspect of the present disclosure, a method of driving a display device including a display panel configured to display images, a plurality of circuit boards connected to one side of the display panel, a cable electrically connecting at least two of the plurality of circuit boards, voltage lines disposed on the cable, the plurality of circuit boards, and the display panel, a deviation compensation circuit configured to sense voltages transmitted through a circuit board on one side and a circuit board on the other side connected by the cable among the plurality of circuit boards and to output a signal based on the sensed voltage, and a variable circuit electrically connected to the deviation compensation circuit includes sensing voltages transmitted through the circuit board on one side and the circuit board on the other side, outputting a signal for controlling the variable circuit based on the voltages sensed from the circuit board on one side and the circuit board on the other side, and compensating for a current difference between the circuit board on one side and the circuit board on the other side based on the signal.

It is to be understood that both the foregoing general description and the following detailed description of the present disclosure are exemplary and explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION OF THE EMBODIMENTS

Reference will now be made in detail to the preferred embodiments of the present disclosure, examples of which are illustrated in the accompanying drawings. Wherever possible, the same reference numbers will be used throughout the drawings to refer to the same or like parts.

A display device according to the embodiments of the present disclosure can be implemented as a television system, an image player, a personal computer (PC), a navigation device, a wearable electronic device, a home theater, an automobile electric device, a smartphone, or the like, but is not limited thereto. The display device according to the embodiments of the present disclosure can be implemented as a light emitting display (LED) device, a quantum dot display (QDD) device, a liquid crystal display (LCD) device, or the like. However, as an example, a light emitting display device that directly emits light based on inorganic light emitting diodes or organic light emitting diodes will be described below for convenience of description. Further, all components of each display device according to all embodiments of the present disclosure are operatively coupled and configured.

Figure 1:
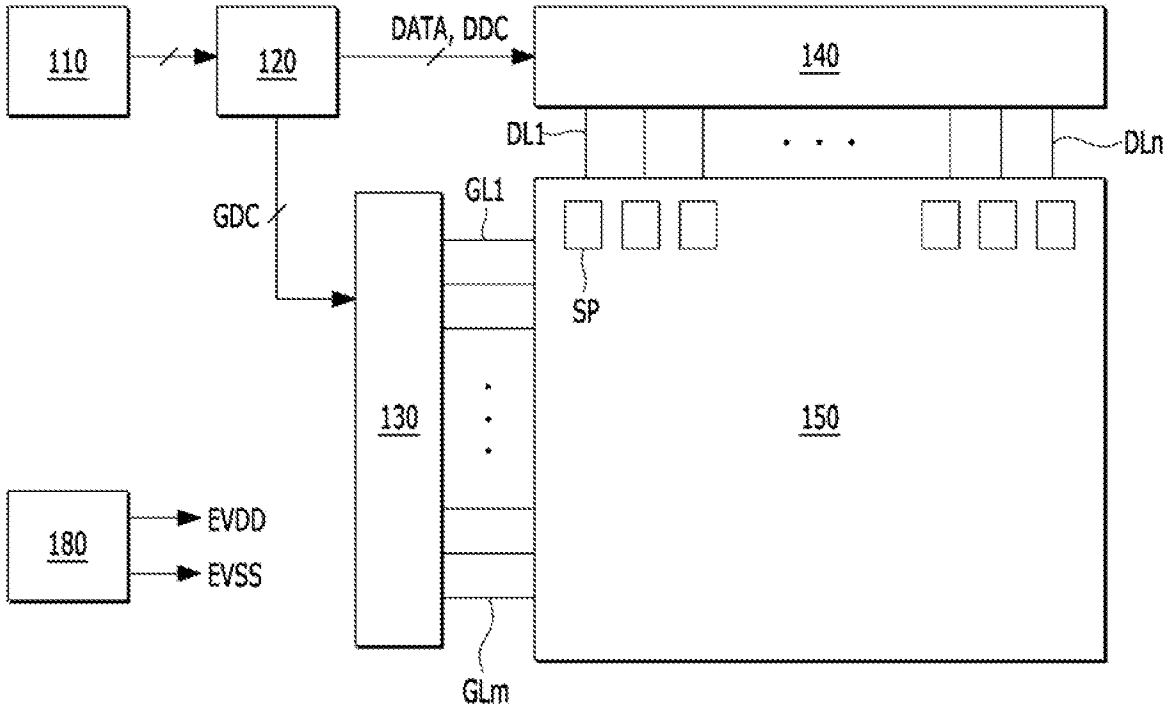
FIG. 1 is a schematic block diagram of a light emitting display device according to an example of the present disclosure.
Figure 2:
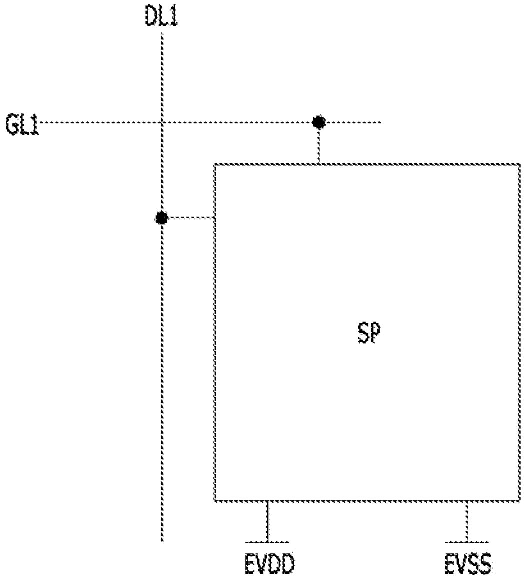
FIG. 2 is a schematic block diagram of an example of a sub-pixel shown in FIG. 1.

FIG. 1 is a schematic block diagram of a light emitting display device according to an example of the present disclosure, and FIG. 2 is a schematic block diagram of a sub-pixel shown in FIG. 1.

As shown in FIGS. 1 and 2, the light emitting display device can include an image provider/processor 110, a timing controller 120, a gate driver (gate drive circuit) 130, a data driver (data drive circuit) 140, a display panel 150, and the power supply 180.

The image provider (set system or host system) 110 can output various driving signals along with an externally supplied image data signal or an image data signal stored in an internal memory. The image provider 110 can supply data signals and various driving signals to the timing controller 120.

The timing controller 120 can output a gate timing control signal GDC for controlling operation timing of the gate driver 130, a data timing control signal DDC for controlling operation timing of the data driver 140, and various synchronization signals (a vertical synchronization signal VSYNC and a horizontal synchronization signal HSYNC). The timing controller 120 can supply a data signal DATA supplied from the image provider 110 to the data driver 140 along with the data timing control signal DDC. The timing controller 120 can be implemented in the form of an integrated circuit (IC) and mounted on a printed circuit board, but is not limited thereto.

The gate driver 130 can output a gate signal (or a gate voltage) in response to the gate timing control signal GDC supplied from the timing controller 120. The gate driver 130 can supply the gate signal to sub-pixels included in the display panel 150 through gate lines GL1 to GLm where m can be a positive number such as a positive integer. The gate driver 130 can be implemented in the form of an IC or directly formed on the display panel 150 in a gate-in-panel structure, but is not limited thereto.

The data driver 140 can sample and latch the data signal DATA in response to the data timing control signal DDC supplied from the timing controller 120, convert the digital data signal into an analog data voltage on the basis of a gamma reference voltage, and output the analog data voltage. The data driver 140 can supply data voltages to the sub-pixels included in the display panel 150 through data lines DL1 to DLn where n can be a positive number such as a positive integer. The data driver 140 can be implemented in the form of an IC and mounted on the display panel 150 or mounted on a printed circuit board, but is not limited thereto.

The power supply 180 can generate a high-potential voltage and a low-potential voltage on the basis of an external input voltage supplied from the outside, and output the same through a first voltage line EVDD and a second voltage line EVSS. The power supply 180 can generate and output a voltage required to drive the gate driver 130 or a voltage required to drive the data driver 140 as well as the high-potential voltage and the low-potential voltage.

The display panel 150 can display an image in response to driving signals including gate signals and data voltages and driving voltages including the high-potential voltage and the low-potential voltage. Sub-pixels of the display panel 150 directly emit light. The display panel 150 can be manufactured based on a rigid or flexible substrate such as glass, silicon, or polyimide. Further, the sub-pixels emitting light can include red, green, and blue pixels or red, green, blue, and white pixels.

For example, one sub-pixel SP can be connected to the first data line DL1, the first gate line GL1, the first voltage line EVDD, and the second voltage line EVSS, and can include a pixel circuit composed of a switching transistor, a driving transistor, a capacitor, an organic light emitting diode, and the like. Since sub-pixels SP used in a light emitting display device directly emit light, the circuit configuration thereof is complicated. Further, there are various organic light emitting diodes emitting light and various compensation circuits for compensating for deterioration of driving transistors that supply driving current necessary to drive the organic light emitting diodes. Accordingly, it is noted that the sub-pixel SP is simply illustrated in the form of a block.

Meanwhile, in the above description, the timing controller 120, the gate driver 130, and the data driver 140 are individual components. However, one or more of the timing controller 120, the gate driver 130, and the data driver 140 can be integrated into one IC depending on a light emitting display device implementation method.

Figure 3:
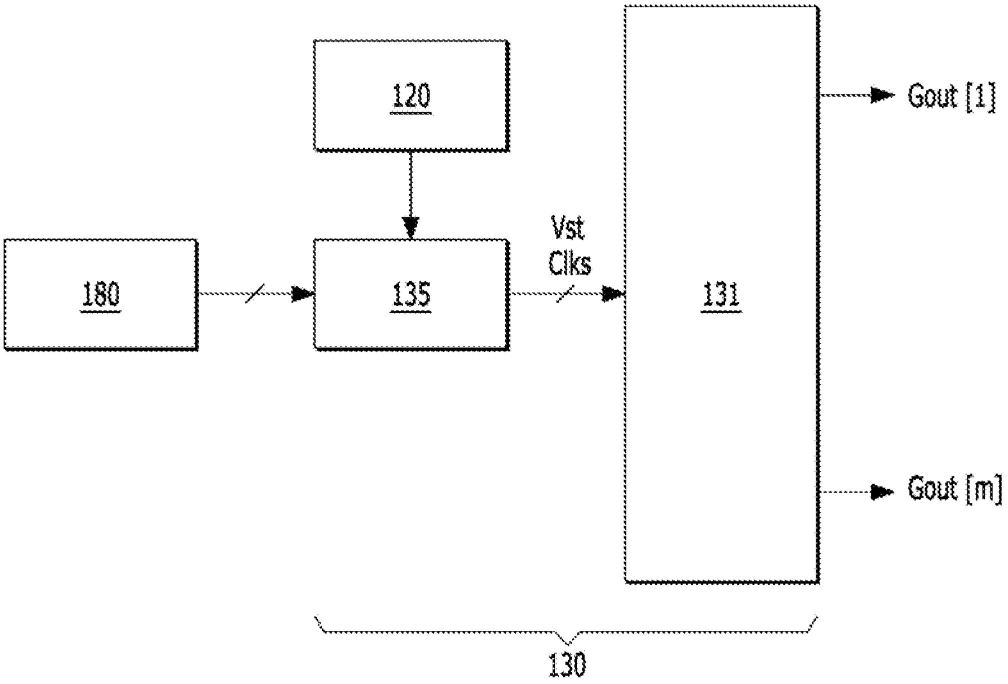
FIGS. 3 and 4 are diagrams for describing a configuration of a gate-in-panel type gate driver according to an examples of the present disclosure.
Figure 4:
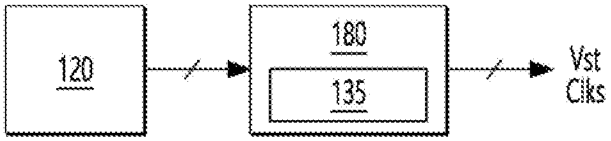
Figure 5:
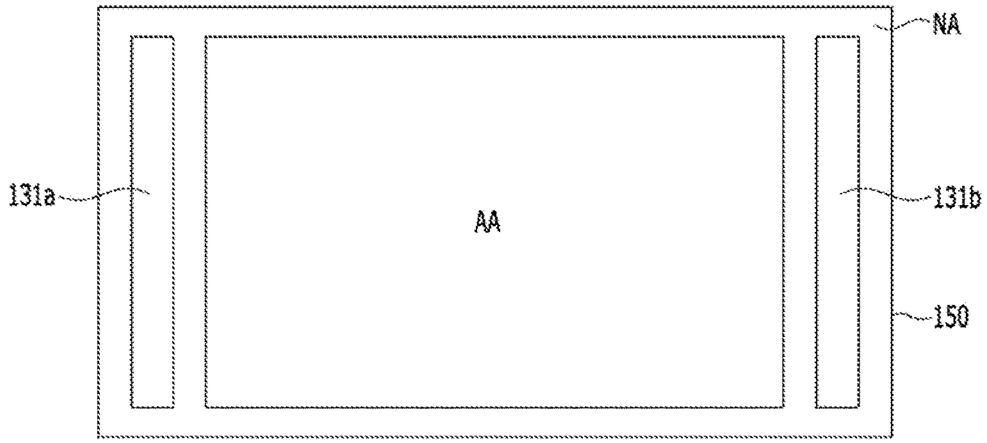
FIG. 5 is a diagram showing an example of arrangement of shift registers included in the gate driver of FIGS. 3 and 4.

FIGS. 3 and 4 are diagrams for describing a configuration of a gate-in-panel type gate driver of a display device according to an example of the present disclosure, and FIG. 5 is a diagram showing an example of arrangement of shift registers included in the gate driver of FIGS. 3 and 4.

As shown in FIG. 3, the gate-in-panel type gate driver 130 can include a shift register 131 and a level shifter 135. The level shifter 135 can generate clock signals Clks and a start signal Vst on the basis of signals and voltages output from the timing controller 120 and the power supply 180. The shift register 131 operates based on the clock signals Clks and the start signal Vst output from the level shifter 135 and can output gate signals Gout[1] to Gout[m].

As shown in FIGS. 3 and 4, the level shifter 135 can be implemented independently in the form of an IC unlike the shift register 131 or can be included inside the power supply 180. However, this is merely an example and the present disclosure is not limited thereto.

As shown in FIG. 5, first and second shift registers 131*a* and 131*b* outputting gate signals in the gate-in-panel type gate driver can be disposed in non-display areas (non-active areas) NA of the display panel 150. The first and second shift registers 131*a* and 131*b* can be implemented in the form of a thin film on the display panel 150 in a gate-in-panel structure. Although an example in which the first and second shift registers 131*a* and 131*b* are respectively disposed in left and right non-display areas NA of the display panel 150 is illustrated, the present disclosure is not limited thereto and the first and second shift registers 131*a* and 131*b* can be disposed at different parts of the display panel 150. The display panel 150 includes a display area (active area) AA as well as the non-display area NA adjacent to or surrounding the display area AA.

Figure 6:
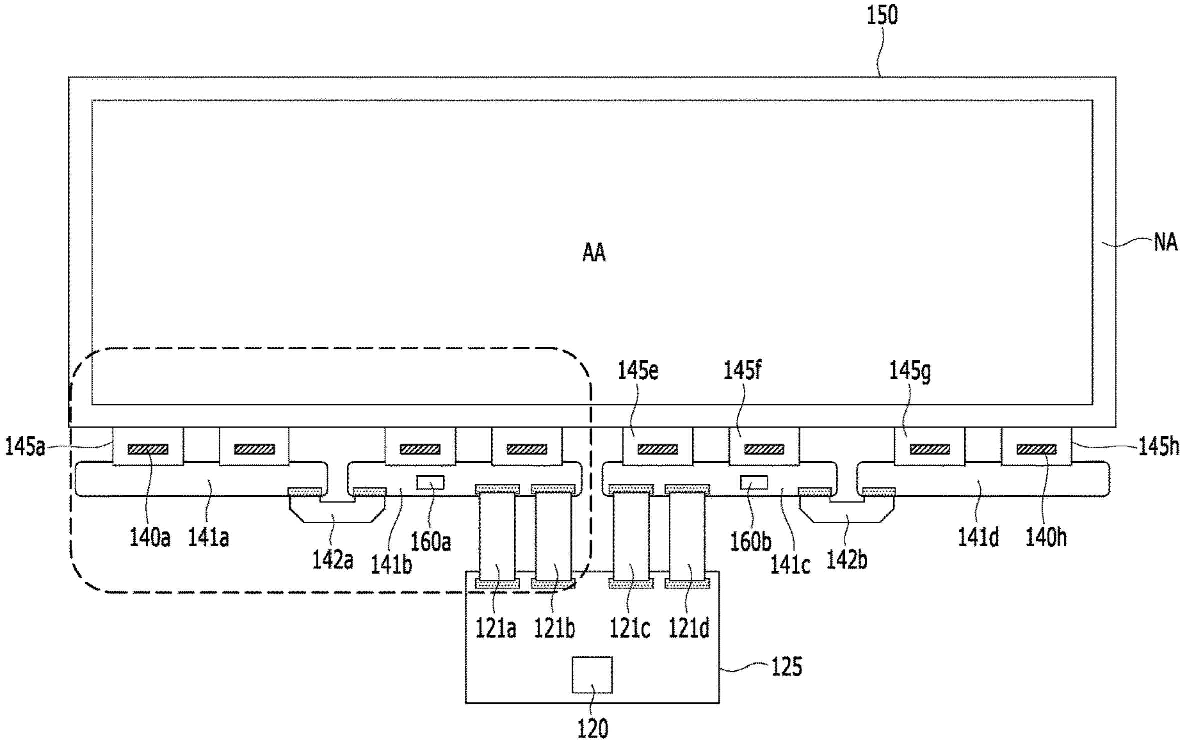
FIG. 6 is a diagram showing a part of a modularized light emitting display device according to a first embodiment of the present disclosure.
Figure 7:
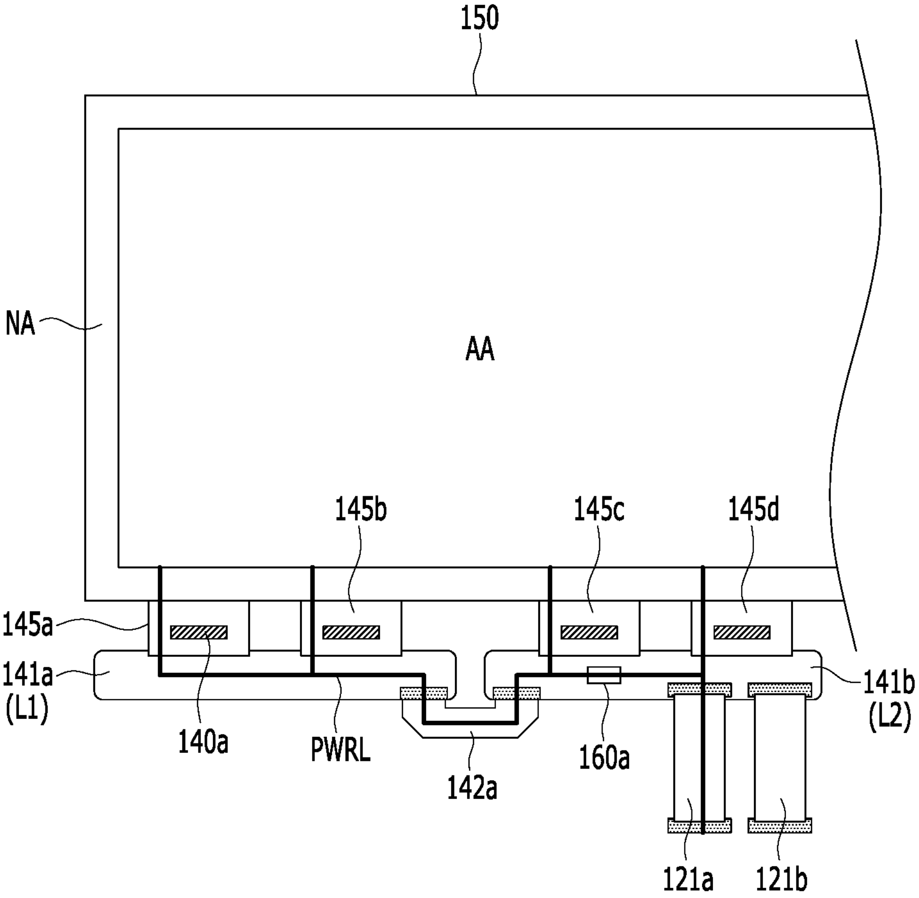
FIG. 7 is a diagram showing an example of components included in a dotted line area of FIG. 6 according to the first embodiment.
Figure 8:
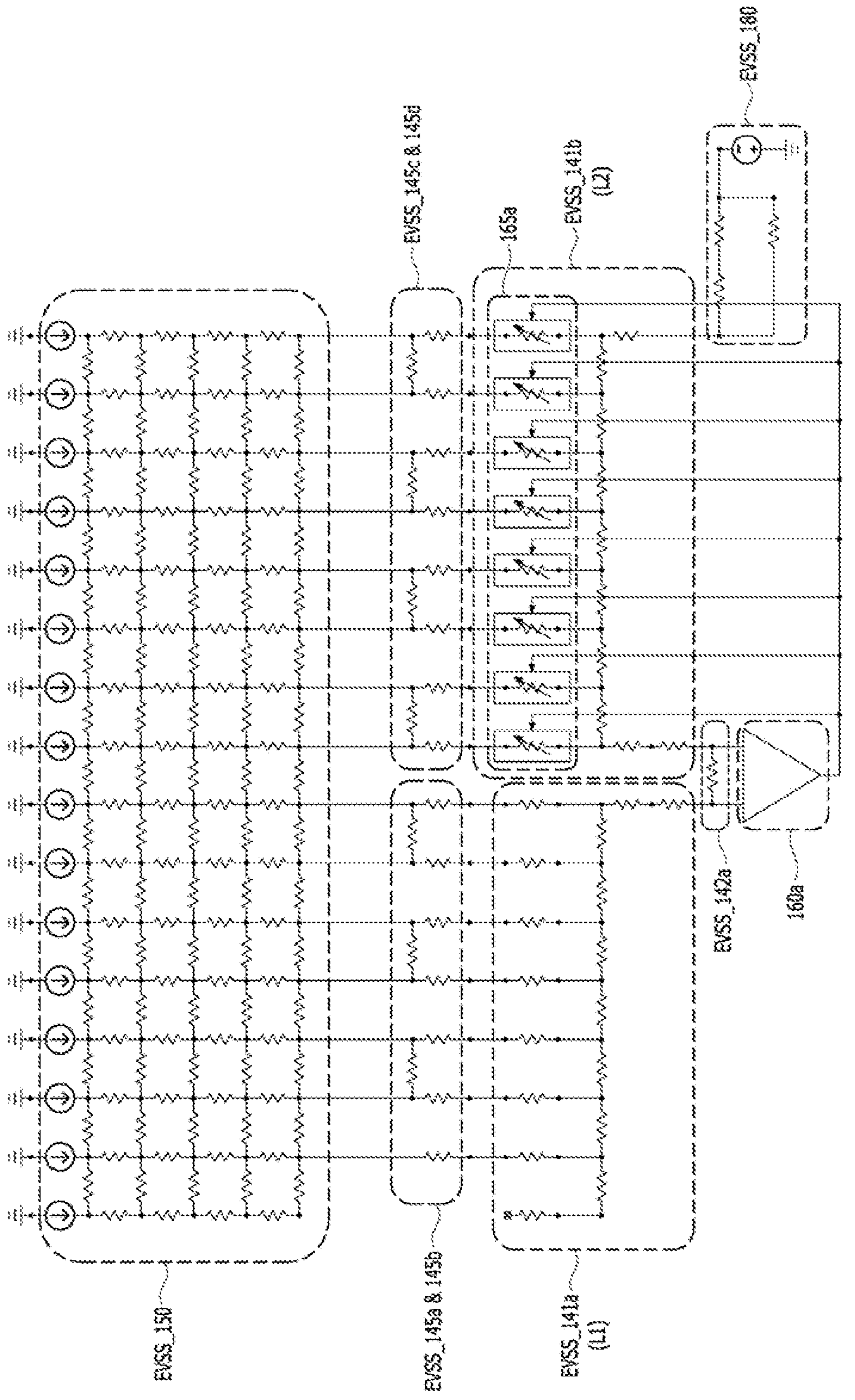
FIG. 8 is an equivalent circuit diagram showing an example of the components included in the dotted line area of FIG. 6 according to the first embodiment.
Figure 9:
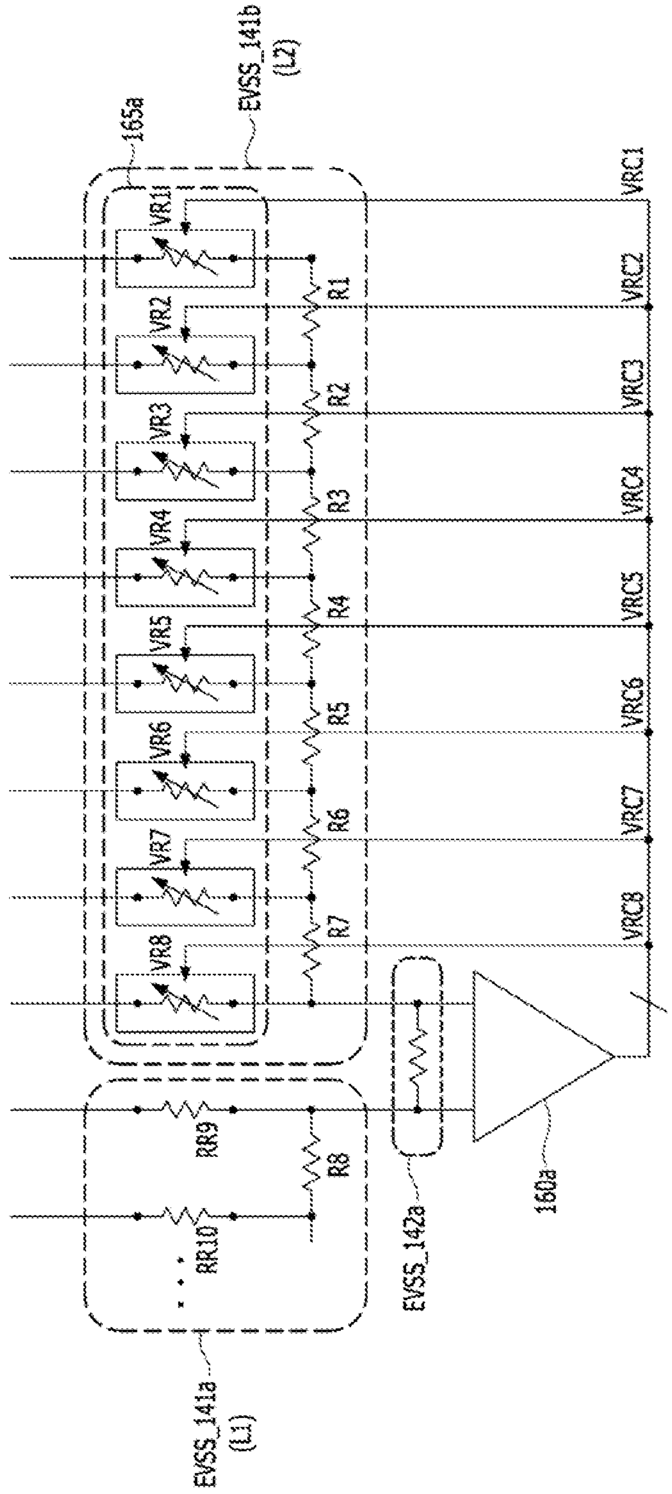
FIG. 9 is a circuit diagram for describing an example of a deviation compensation circuit according to the first embodiment in more detail.
Figure 10:
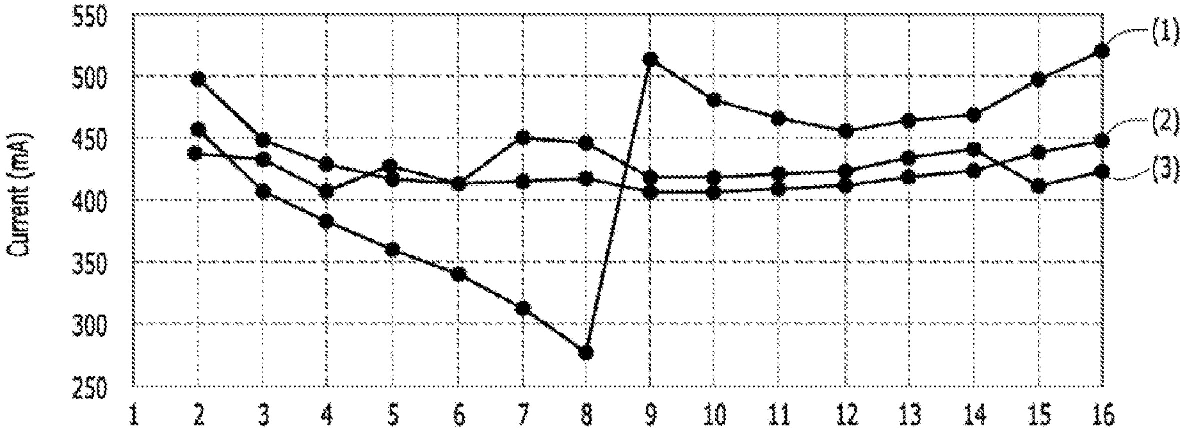
FIG. 10 is a diagram showing an example of simulation results for describing the advantages of the deviation compensation circuit according to the first embodiment.

FIG. 6 is a diagram showing a part of a modularized light emitting display device according to a first embodiment of the present disclosure, FIG. 7 is a diagram showing components included in a dotted line area of FIG. 6 according to the first embodiment, FIG. 8 is an equivalent circuit diagram showing the components included in the dotted line area of FIG. 6 according to the first embodiment, FIG. 9 is a circuit diagram for describing a deviation compensation circuit according to the first embodiment in more detail, and FIG. 10 is a diagram showing simulation results for describing the advantages of the deviation compensation circuit according to the first embodiment.

As shown in FIGS. 6 and 7, a timing controller 120, data drivers 140*a* to 140*h*, and a display panel 150 can be modularized by a first circuit board 125, first cables 121*a* to 121*d*, second circuit boards 141*a*, 141*b*, 141*c* and 141*d*, second cables 142*a* and 142*b*, and third circuit boards 145*a* to 145*h*.

The timing controller 120 can be mounted on the first circuit board 125, and the data drivers 140*a* to 140*h* can be mounted on the third circuit boards 145*a* to 145*h*, respectively. It is noted that a scan driver is not shown since it can be formed in a non-display area of the display panel 150 in a gate-in-panel structure, and a power supply is not shown since it can be mounted at different positions depending on light emitting display device implementation methods.

The first cables 121*a* to 121*d* can serve to electrically connect the first circuit board 125 and the second circuit boards 141*a* to 144*d*, and the second cables 142*a* and 142*b* can serve to electrically connect the second circuit boards 141*a* to 144*d*.

The (1-1)-th cable 121*a* and the (1-2)-th cable 121*b* can serve to electrically connect the first circuit board 125 and the (2-2)-th circuit board 141*b*, and the (1-3)-th cable 121*c* and the (1-4)-th cable 121*d* can serve to electrically connect the first circuit board 125 and the (2-3)-th circuit boards 141*c*. The (2-1)-th cable 142*a* can serve to electrically connect the (2-1)-th circuit board 141*a* and the (2-2)-th circuit board 141*b*, and the (2-2)-th cable 142*b* can serve to electrically connect the (2-3)-th circuit board 141*c* and the (2-4)-th circuit board 141*d*.

The first circuit board 125 and the second circuit boards 141*a* to 144*d* can be printed circuit boards (PCBs) or the like. The third circuit boards 145*a* to 145*h* can be flexible printed circuit boards (FPCBs) or the like. The first cables 121*a* to 121*d* and the second cables 142*a* and 142*b* can be flexible flat cables (FFCs) or the like. The first cables 121*a* to 121*d* and the second cables 142*a* and 142*b* can provide communication interfaces (data transmission lines) through which the timing controller 120 and the data drivers 140*a* to 140*h* can perform data communication and provide lines (wirings) for transmitting various signals or power.

According to the first embodiment, the light emitting display device can include a first deviation compensation circuit 160*a* and a second deviation compensation circuit 160*b*. The first deviation compensation circuit 160*a* and the second deviation compensation circuit 160*b* can serve to compensate for current deviations that can be caused by physical separation of voltage lines for transmitting voltages to the display panel 150 by a plurality of circuit boards or a plurality of cables.

FIG. 6 illustrates an example in which the first deviation compensation circuit 160*a* and the second deviation compensation circuit 160*b* are disposed on the (2-2)-th circuit board 141*b* and the (2-3)-th circuit board 141*c* according to the first embodiment. However, the module shown in FIG. 6 is merely an example and can vary depending on the light emitting display device implementation method or the size (or resolution) of the display panel. For example, in order to improve the accuracy of voltage sensing performed during deviation compensation, the first deviation compensation circuit 160*a* and the second deviation compensation circuit 160*b* can be disposed on the (2-1)-th cable 142*a* and the (2-2)-th cable 142*b*.

Accordingly, the positions where the first deviation compensation circuit 160*a* and the second deviation compensation circuit 160*b* are disposed are not limited to those shown in FIG. 6 and can be changed in consideration of the configuration of the device or power transmission paths. However, the embodiment will be described using the first deviation compensation circuit 160*a* disposed on the (2-2)-th circuit board 141*b* for convenience of description.

As shown in FIG. 7, voltage lines PWRL for transmitting voltages necessary to drive the display panel 150 can extend to the display panel 150 through the first cable 121*a* (or the second cable 121*b*), the (2-1)-th circuit board 141*a*, the (2-2)-th circuit board 141*b*, and the (3-1)-th to (3-4)-th circuit boards 145*a* to 145*d*. The voltage lines PWRL can have different wiring resistance values depending on the location where they are disposed and the material thereof.

Hereinafter, in order to aid in understanding related to the first deviation compensation circuit 160*a*, an example in which the second voltage line among the voltage lines PWRL disposed in the area shown in FIG. 7 is modeled in the form of a resistor will be described.

If the second voltage line EVSS disposed on the display panel 150, the (3-1)-th circuit board 145*a* to the (3-4)-th circuit board 145*d*, the (2-1)-th circuit board 141*a*, the (2-2)-th circuit board 141*b*, and the (2-1)-th cable 142*a* shown in FIG. 7 is modeled in the form of a resistor, the second voltage line EVSS can be represented in the form shown in FIG. 8. FIG. 8 illustrates an example in which the power supply 180 that supplies a second voltage applies the second voltage to the (2-2)-th circuit board 141*b* first for modeling corresponding to FIG. 7.

As shown in FIG. 8, when the input point for supplying the second voltage is adjacent to the (2-2)-th circuit board 141*b* and is spaced apart from the (2-1)-th circuit board 141*a*, the (2-2)-th circuit board 141*b* and the (2-1)-th circuit board 141*a* can have a difference in current applied thereto (current deviation) corresponding to wiring resistances present in the voltage lines therebetween.

The first deviation compensation circuit 160*a* can use a first variable circuit 165*a* disposed on the (2-2)-th circuit board 141*b* in order to compensate for a difference between the second voltage transmitted through the (2-1)-th circuit board 141*a* and the second voltage transmitted through the (2-2)-th circuit board 141*b*, which will be described as follows.

As shown in FIG. 9, the first deviation compensation circuit 160*a* can have a first input terminal connected to a second voltage line EVSS_141*a* disposed on the (2-1)-th circuit board 141*a*, which is one side L1 of the (2-1)-th cable 142*a*, a second input terminal connected to a second voltage line EVSS_141*b* disposed on the (2-2)-th circuit board 141*b*, which is the other side L2 of the (2-1)-th cable 142*a*, and an output terminal connected to the first variable circuit 165*a*.

The first variable circuit 165*a* can include variable resistors VR1 to VR8. The first variable resistor VR1 to the eighth variable resistor VR8 can have variable resistance values corresponding to first to eighth variable signals VRC1 to VRC8 output through the output terminal of the first deviation compensation circuit 160*a*. Although FIGS. 8 and 9 show only eight variable resistors, the number of variable resistors can depend on the number of second voltage lines.

The first variable resistor VR1 to the eighth variable resistor VR8 disposed on the (2-2)-th circuit board 141*b* can be regarded as variable forms of resistors RR9 and RR10 (wiring resistance of the second voltage line) disposed on the (2-1)-th circuit board 141*a*. For example, the first variable resistor VR1 to the eighth variable resistor VR8 are compensation resistors capable of varying the resistance value for each position of the second voltage line.

The first deviation compensation circuit 160*a* can sense the second voltage transmitted through the second voltage line EVSS_141*a* disposed on the (2-1)-th circuit board 141*a*, which is one side L1 of the (2-1)-th cable 142*a*, and the second voltage line EVSS_141*b* disposed on the (2-2)-th circuit board 141*b*, which is the other side L2 of the (2-1)-th cable 142. The first deviation compensation circuit 160*a* can determine a difference between the second voltages sensed through the two input terminals based on a differential amplifier and the like, but the present disclosure is not limited thereto.

The first deviation compensation circuit 160*a* can output variable signals VRC1 to VRC8 for varying the resistance value of the first variable circuit 165*a* disposed on the (2-2)-th circuit board 141*b* in order to compensate for a difference between the second voltage transmitted through the (2-1)-th circuit board 141*a* and the second voltage transmitted through the (2-2)-th circuit board 141*b* based on the sensed voltage. The first deviation compensation circuit 160*a* can vary the levels of the voltages of the variable signals VRC1 to VRC8 as shown in Table 1 below in order to vary the resistance value of the first variable circuit 165*a*, but the present disclosure is not limited thereto.

TABLE 1

| Voltage (V) | Resistance (ohm) |
|---|---|
| 0.1 V | 0.1 ohm |
| 0.2 V | 0.2 ohm |
| 0.3 V | 0.3 ohm |
| 0.4 V | 0.4 ohm |
| 0.5 V | 0.5 ohm |

The first deviation compensation circuit 160*a* can output a signal for varying at least one of the first variable resistors VR1 to the eighth variable resistors VR8 without outputting a signal for varying all thereof. For example, the first deviation compensation circuit 160*a* can vary the resistance value of at least one of the first variable resistor VR1 to the eighth variable resistor VR8 in response to the difference between the second voltages sensed through the two input terminals.

As shown in FIG. 10, it can be ascertained that the deviation compensation circuit and the first variable circuit are not provided, and thus large current deviations occur at first to sixteenth points in a comparative example (1). On the other hand, it can be ascertained that the current deviations occurring at the first to sixteenth points are greatly reduced because the deviation compensation circuit and the first variable circuit are provided in first and second examples (2) and (3).

The first variable circuit is disposed only on the (2-2)-th circuit board in the first example (2), and the first variable circuit is disposed on both the (2-1)-th circuit board and the (2-2)-th circuit board in the second example (3). As can be ascertained with reference to the comparative example (1), the first example (2), and the second example (3), it is possible to compensate for (improve) current deviations that can be caused by physical separation of the second voltage lines for transmitting the second voltage to the display panel by a plurality of circuit boards or a plurality of cables by using the deviation compensation circuit and the first variable circuit.

Figure 11:
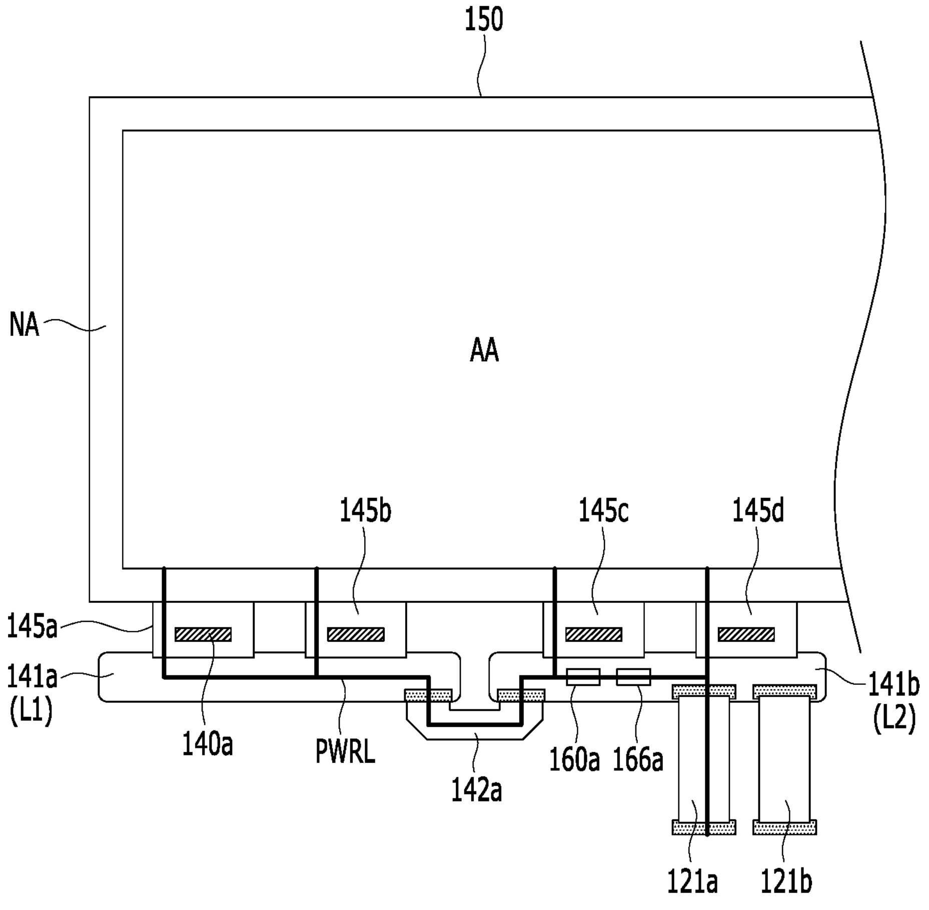
FIG. 11 is a diagram showing an example of the components included in the dotted line area of FIG. 6 according to a second embodiment of the present disclosure.
Figure 12:
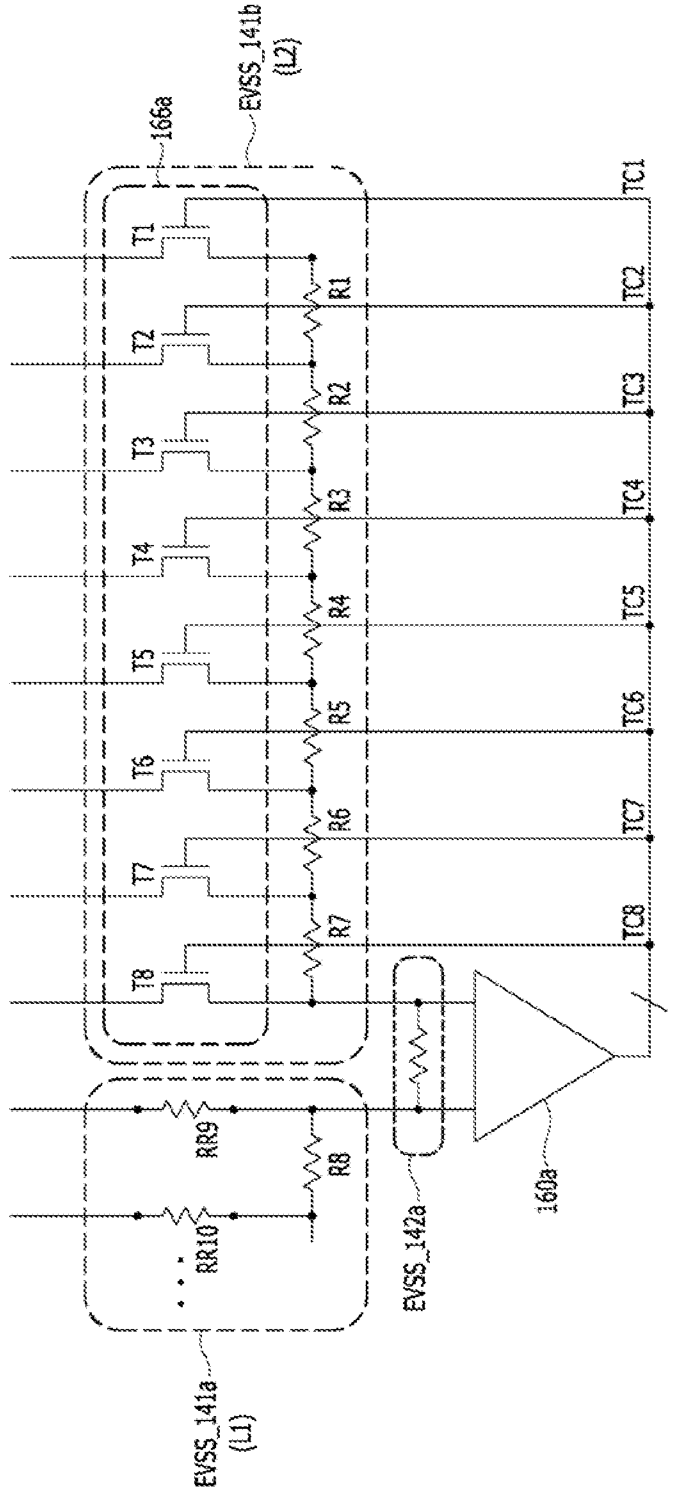
FIG. 12 is an equivalent circuit diagram showing an example of the components included in the dotted line area of FIG. 6 according to the second embodiment.
Figure 13:
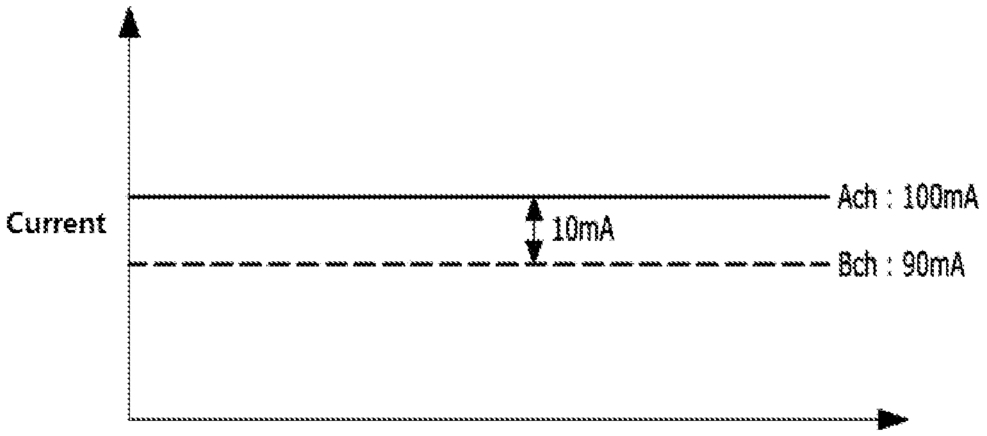
FIGS. 13 and 14 are an example of waveform diagrams for describing the advantages of the deviation compensation circuit according to the second embodiment.
Figure 14:
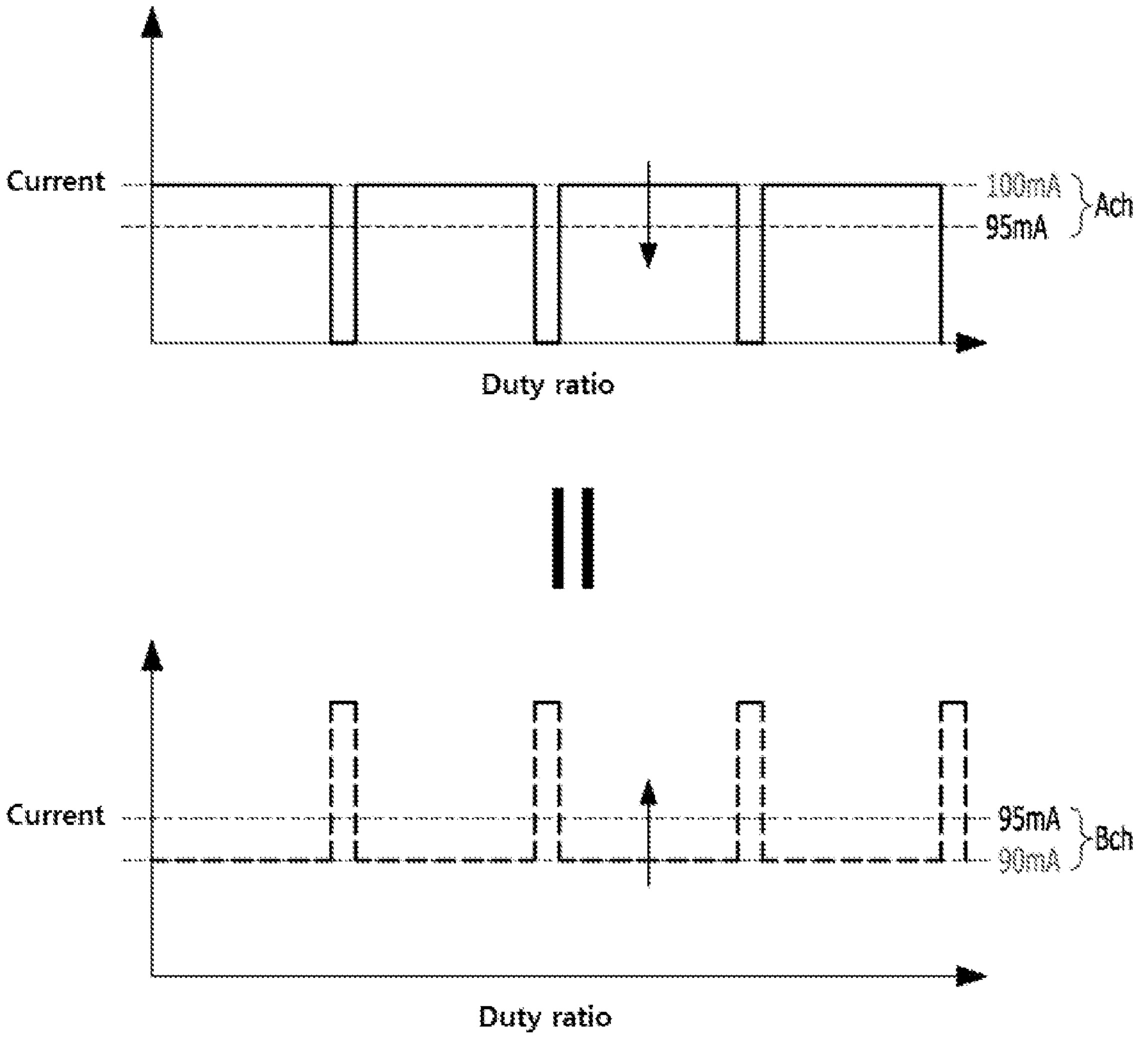

FIG. 11 is a diagram showing the components included in the dotted line area of FIG. 6 according to a second embodiment of the present disclosure, FIG. 12 is an equivalent circuit diagram showing the components included in the dotted line area of FIG. 6 according to the second embodiment, and FIGS. 13 and 14 are waveform diagrams for describing the advantages of the deviation compensation circuit according to the second embodiment.

As shown in FIG. 11, the voltage lines PWRL for transmitting voltages necessary to drive the display panel 150 extend to the display panel 150 through the first cable 121*a* (or the second cable 121*b*), the (2-1)-th circuit board 141*a*, the (2-2)-th circuit board 141*b*, and the (3-1)-th circuit board 145*a* to the (3-4)-th circuit board 145*d*. The voltage lines PWRL can have different wiring resistance values depending on the location where they are disposed and the material thereof.

Hereinafter, in order to aid in understanding related to the first deviation compensation circuit 160*a*, an example in which the second voltage line among the voltage lines PWRL disposed in the area shown in FIG. 11 is modeled in the form of a resistor will be described.

If the second voltage line EVSS disposed on the display panel 150, the (3-1)-th circuit board 145*a* to the (3-4)-th circuit board 145*d*, the (2-1)-th circuit board 141*a*, the (2-2)-th circuit board 141*b*, and the (2-1)-th cable 142*a* shown in FIG. 11 is modeled in the form of a resistor, the second voltage line EVSS can be represented in the form shown in FIG. 12. FIG. 12 also illustrates an example in which the power supply that supplies the second voltage applies the second voltage to the (2-2)-th circuit board 141*b* first. In addition, when the input point for supplying the second voltage is adjacent to the (2-2)-th circuit board 141*b* and spaced apart from the (2-1)-th circuit board 141*a*, the (2-2)-th circuit board 141*b* and the (2-1)-th circuit board 141*a* can have a difference in current applied thereto (current deviation) corresponding to wiring resistances present in the voltage line therebetween.

As shown in FIG. 11, the first deviation compensation circuit 160*a* can use a second variable circuit 166*a* disposed on the (2-2)-th circuit board 141*b* in order to compensate for a difference between the second voltage transmitted through the (2-1)-th circuit board 141*a* and the second voltage transmitted through the (2-2)-th circuit board 141*b*, which will be described as follows.

As shown in FIG. 12, the first deviation compensation circuit 160*a* can have the first input terminal connected to the second voltage line EVSS_141*a* disposed on the (2-1)-th circuit board 141*a*, which is one side L1 of the (2-1)-th cable 142*a*, the second input terminal connected to the second voltage line EVSS_141*b* disposed on the (2-2)-th circuit board 141*b*, which is the other side L2 of the (2-1)-th cable 142*a*, and the output terminal connected to the second variable circuit 166*a*.

The second variable circuit 166*a* can include transistors T1 to T8. The first transistor T1 to the eighth transistor T8 can be turned on or off in response to first to eighth control signals TC1 to TC8 output through the output terminal of the first deviation compensation circuit 160*a*. The first to eighth transistors T1 to T8 disposed on the (2-2)-th circuit board 141*b* are compensation transistors capable of controlling the current flowing through the second voltage line. Although FIG. 12 illustrates only eight transistors, the number of transistors can depend on the number of second voltage lines.

The first deviation compensation circuit 160*a* can sense the second voltage transmitted through the second voltage line EVSS_141*a* disposed on the (2-1)-th circuit board 141*a*, which is one side L1 of the (2-1)-th cable 142*a*, and the second voltage line EVSS_141*b* disposed on the (2-2)-th circuit board 141*b*, which is the other side L2 of the (2-1)-th cable 142*a*. The first deviation compensation circuit 160*a* can determine a difference between the second voltages sensed through the two input terminals based on a differential amplifier and the like, but the present disclosure not limited thereto.

The first deviation compensation circuit 160*a* can output control signals TC1 to TC8 for controlling an on/off duty ratio (varying a pulse width) of the second variable circuit 166*a* disposed on the (2-2)-th circuit board 141*b* in order to compensate for a difference between the current transmitted through the (2-1)-th circuit board 141*a* and the current transmitted through the (2-2)-th circuit board 141*b* based on the sensed voltage.

The first deviation compensation circuit 160*a* can output a signal for individually controlling (independently controlling for each channel) at least one of the first to eighth transistors T1 to T8 instead of outputting a signal for turning on/off all of the first to eighth transistors T1 to T8. For example, the first deviation compensation circuit 160*a* can sense voltages through the two input terminals, determine a current difference based on the sensed voltages, and independently control the amount of current flowing through at least one of the first to eighth transistors T1 to T8 based on the current difference.

As shown in FIG. 13, when the second voltage lines for transmitting the second voltage to the display panel are physically separated by a plurality of circuit boards or a plurality of cables, a current difference of about 10 mA can occur between an A-th channel Ach and a B-th channel Bch. Here, the A-th channel Ach and the B-th channel Bch can be two points adjacent to the (2-1)-th circuit board 141*a*.

As shown in FIG. 14, the on/off duty ratio of transistors included in the A-th channel Ach can be controlled to decrease the amount of current flowing through the transistors from 100 mA to 95 mA, and the on/off duty ratio of transistors included in the B-th channel Bch can be controlled to increase the amount of current flowing through the transistors from 90 mA to 95 mA.

As can be ascertained with reference to FIGS. 13 and 14, it is possible to compensate for (improve) current deviations that can occur as the second voltage lines for transmitting the second voltage to the display panel are physically separated by a plurality of circuit boards or a plurality of cables by using the deviation compensation circuit and the second variable circuit.

Figure 15:
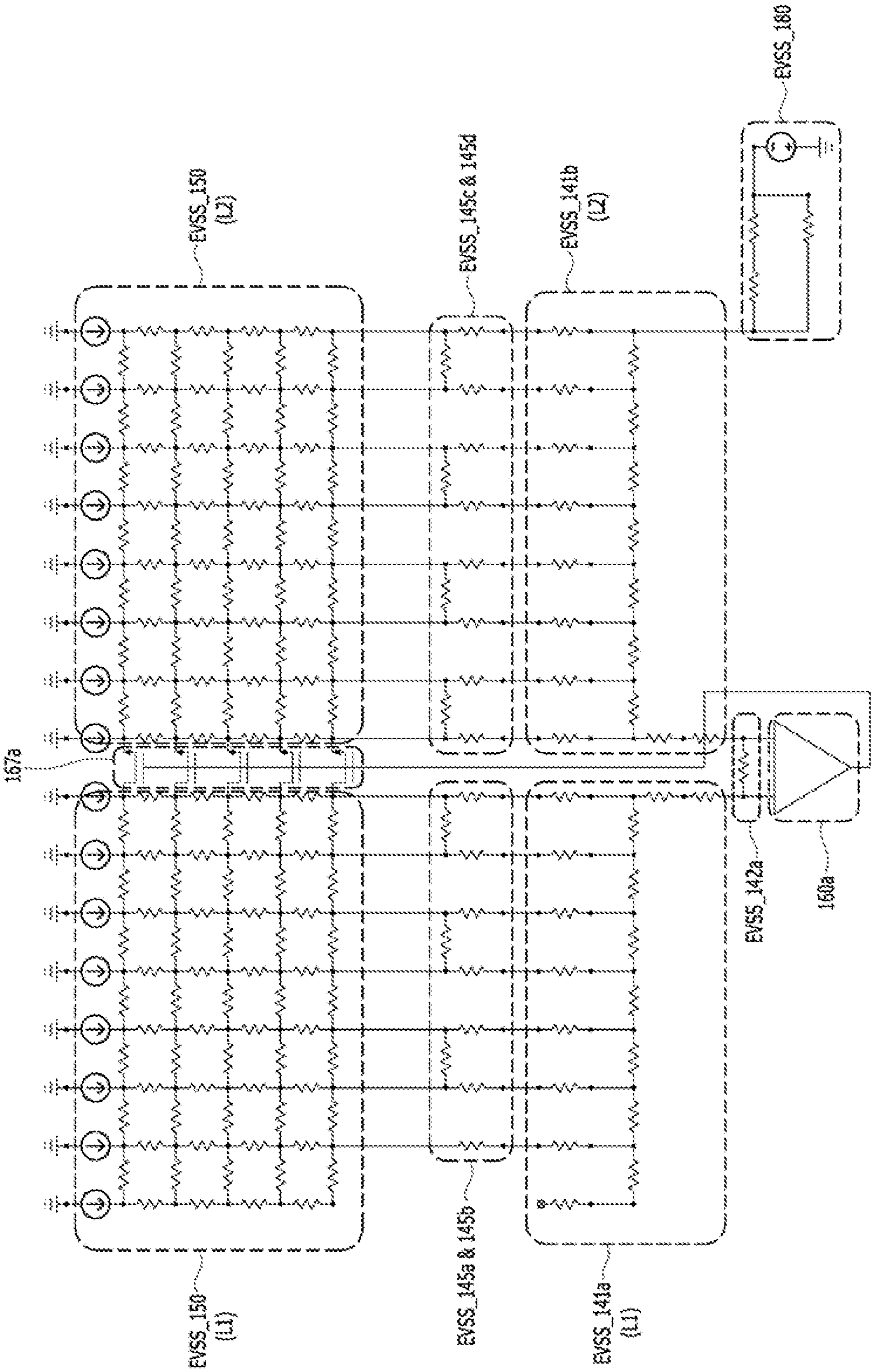
FIG. 15 is an equivalent circuit diagram showing an example of the components included in the dotted line area of FIG. 6 according to a third embodiment of the present disclosure.
Figure 16:
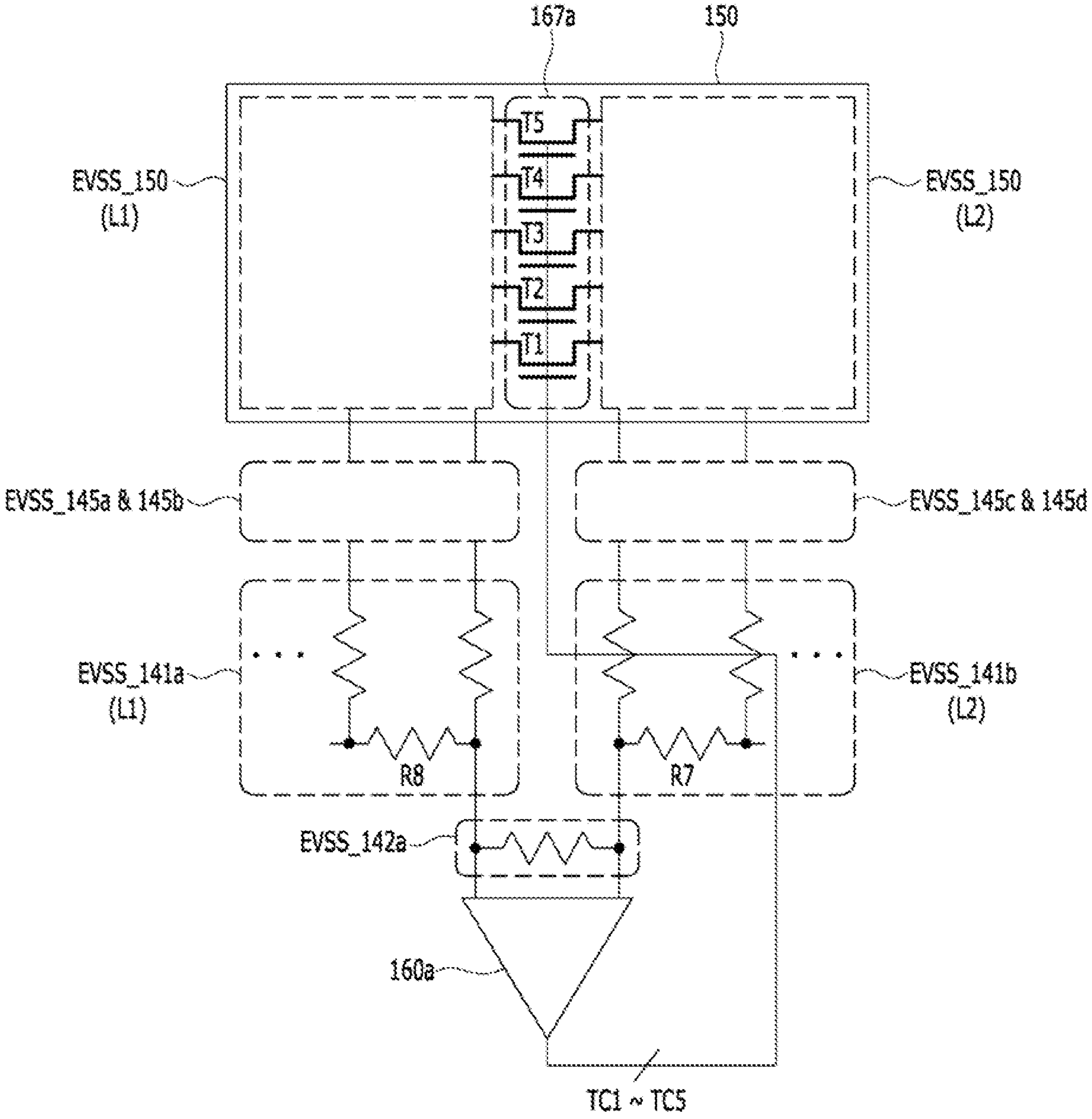
FIG. 16 is a circuit diagram for describing an example of the deviation compensation circuit according to the third embodiment in more detail.
Figure 17:
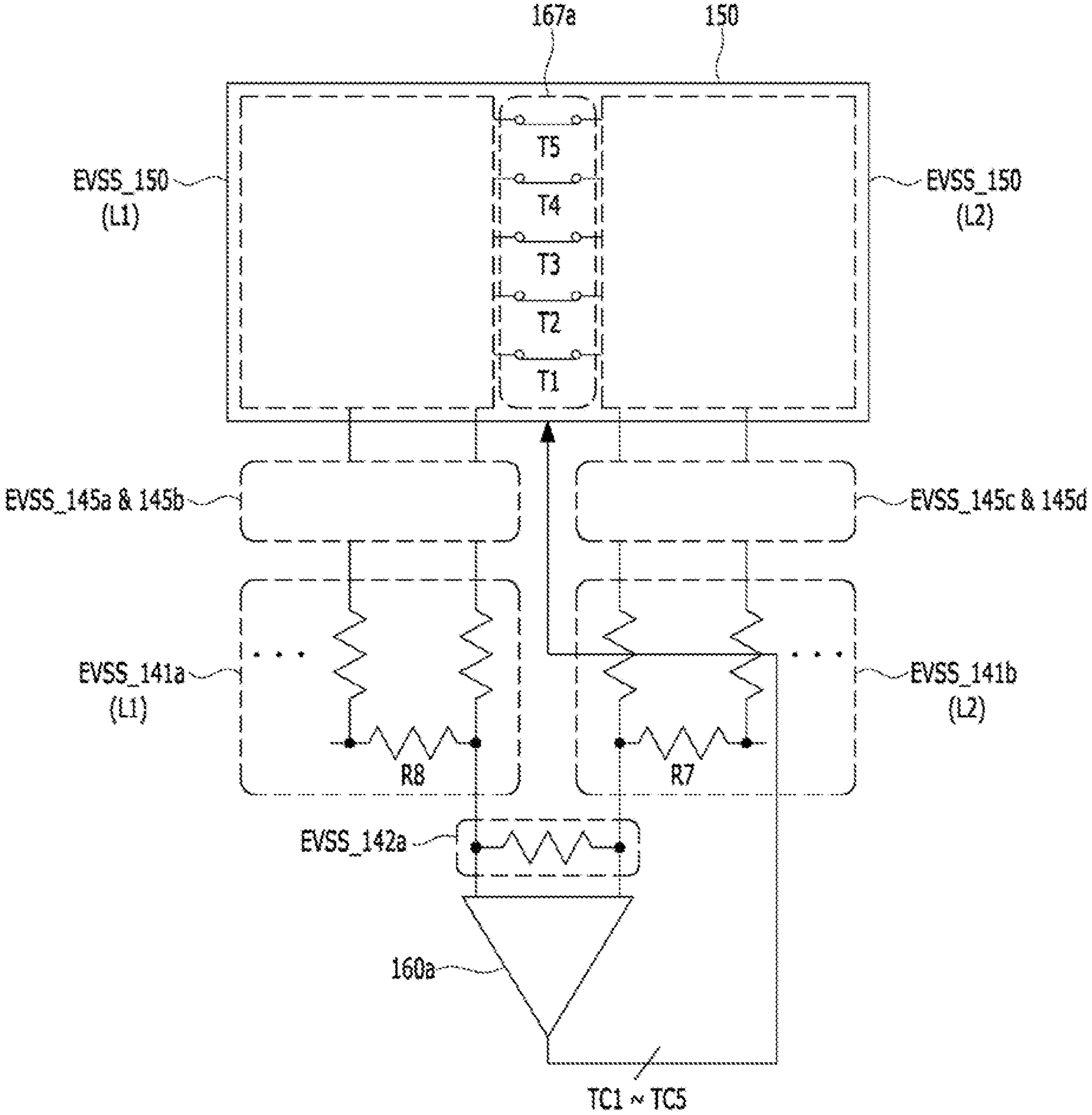
FIGS. 17 and 18 are circuit diagrams showing an example of the operation of the deviation compensation circuit according to the third embodiment.
Figure 18:
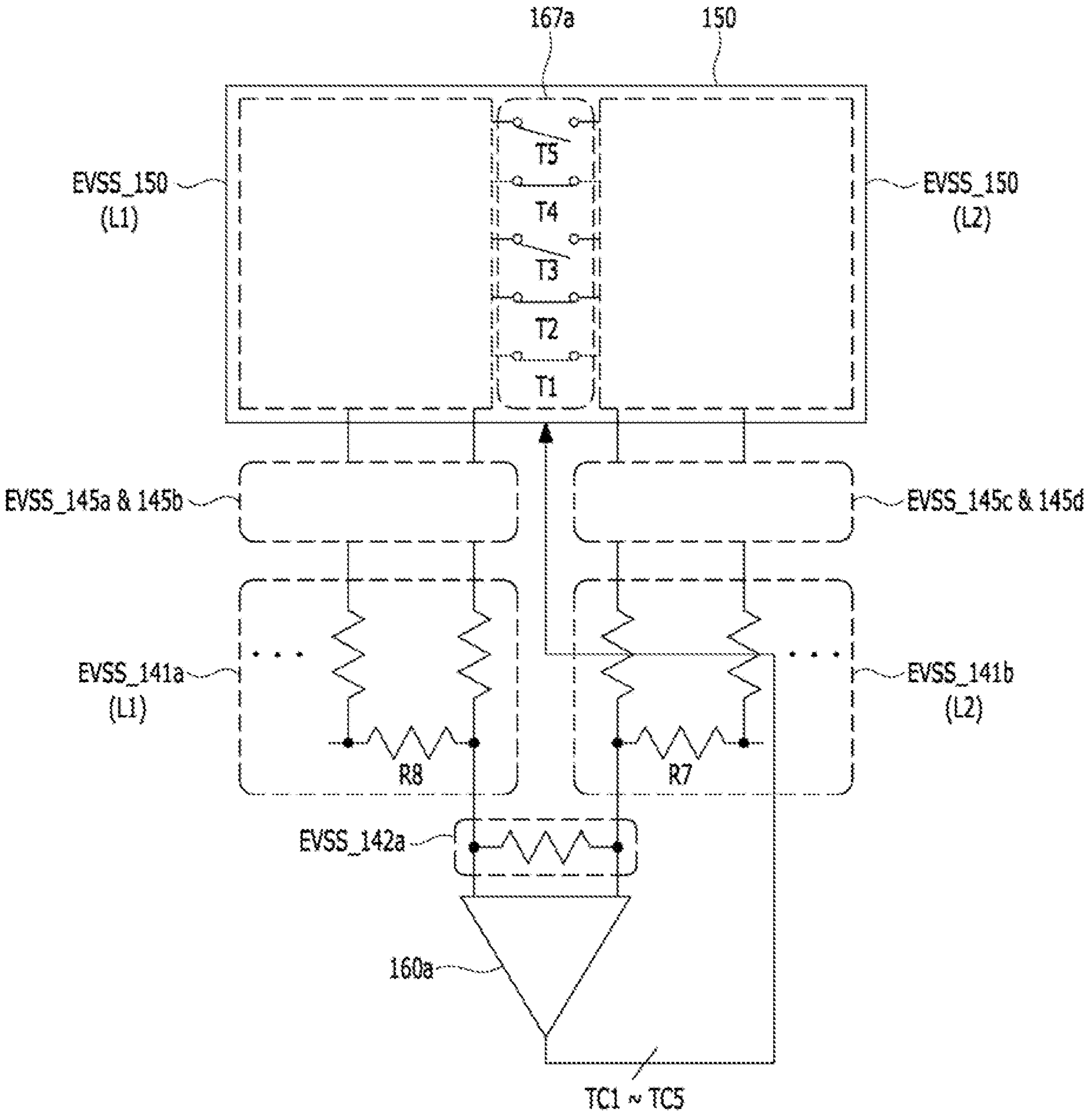

FIG. 15 is an equivalent circuit diagram showing the components included in the dotted line area of FIG. 6 according to a third embodiment of the present disclosure, FIG. 16 is a circuit diagram for describing the deviation compensation circuit according to the third embodiment in more detail, and FIGS. 17 and 18 are circuit diagrams showing the operation of the deviation compensation circuit according to the third embodiment.

As shown in FIG. 15, the first deviation compensation circuit 160*a* can have the first input terminal connected to the second voltage line EVSS_141*a* disposed on the (2-1)-th circuit board 141*a*, which is one side L1 of the (2-1)-th cable 142*a*, the second input terminal connected to the second voltage line EVSS_141*b* disposed on the (2-2)-th circuit board 141*b*, which is the other side L2 of the (2-1)-th cable 142*a*, and the output terminal connected to a third variable circuit 167*a*.

The third variable circuit 167*a* can include transistors T1 to T5. The transistors T1 to T5 can be disposed at a branch point between the second voltage line EVSS_150 disposed on one side L1 of the display panel 150 and the second voltage line EVSS_150 disposed on the other side L2 of the display panel 150. The first transistor T1 to the fifth transistor T5 disposed at the branch points between one side L1 and the other side L2 of the display panel 150 are compensation transistors capable of blocking a voltage or a current flowing through a branch point of the second voltage lines disposed in the horizontal direction of the display area. Although FIG. 15 illustrates five transistors, the number of transistors can depend on the number of second voltage lines disposed in the horizontal direction.

The first transistor T1 to the fifth transistor T5 can be turned on or off in response to first to fifth control signals TC1 to TC5 output through the output terminal of the first deviation compensation circuit 160*a*.

The first deviation compensation circuit 160*a* can sense the second voltage transmitted through the second voltage line EVSS_141*a* disposed on the (2-1)-th circuit board 141*a*, which is one side L1 of the (2-1)-th cable 142*a*, and the second voltage line EVSS_141*b* disposed on the (2-2)-th circuit board 141*b*, which is the other side L2 of the (2-1)-th cable 142*a*. The first deviation compensation circuit 160*a* can determine a difference between the second voltages sensed through the two input terminals based on a differential amplifier and the like, but the present disclosure is not limited thereto.

As shown in FIG. 16, the first deviation compensation circuit 160*a* can output control signals TC1 to TC5 for controlling on/off of the third variable circuit 167*a* disposed in the display area of the display panel 150 in order to compensate for a difference between the second voltage transmitted through the (2-1)-th circuit board 141*a* and the second voltage transmitted through the (2-2)-th circuit board 141*b* based on the sensed voltage.

The first deviation compensation circuit 160*a* can output a signal for individually (independently) controlling at least one of the first transistor T1 to the fifth transistor T5 instead of outputting a signal for turning on/off all of the transistors T1 to T5. For example, the first deviation compensation circuit 160*a* can sense voltages through two input terminals and control (independently control for each channel) on/off of at least one of the first to fifth transistors T1 to T5 based on the sensed voltages. Hereinafter, a case where there is no difference between the sensed voltages and a case where there is a difference therebetween will be described.

As shown in FIG. 17, when there is no difference between the sensed voltages, the first deviation compensation circuit 160*a* can output the control signals TC1 to TC5 for turning on all of the first to fifth transistors T1 to T5. In this case, current branching can occur in the entire area between the second voltage line EVSS_150 disposed on one side L1 of the display panel 150 and the second voltage line EVSS_150 disposed on the other side L2 of the display panel 150.

As shown in FIG. 18, when there is a difference between the sensed voltages, the first deviation compensation circuit 160*a* can output the control signals TC1 to TC5 for turning off the third transistor T3 and the fifth transistor T5 and turning on the first transistor T1, the second transistor T2, and the fourth transistor T4. In this case, since a partial area between the second voltage line EVSS_150 disposed on one side L1 of the display panel 150 and the second voltage line EVSS_150 disposed on the other side L2 of the display panel 150 is disconnected, an area where current branching is blocked can be included.

As can be ascertained with reference to FIGS. 17 and 18, it is also possible to compensate for (improve) current deviations that can be caused by physical separation of the second voltage lines for transmitting the second voltage to the display panel by a plurality of circuit boards or a plurality of cables by using a method of blocking current branching.

Meanwhile, the first to third embodiments have been separately described in the present disclosure. However, one or more of the first to third embodiments can be combined in order to improve compensation accuracy at the time of compensating for (improving) current deviations.

As described above, the present disclosure has an effect of compensating for or improving current deviations that can be caused by physical separation of voltage lines through which a voltage is transmitted to a display panel by a plurality of circuit boards or a plurality of cables. In addition, the present disclosure has an effect of improving display quality by compensating for or improving current deviations that can occur in the display panel.

It will be apparent to those skilled in the art that various modifications and variations can be made in the present disclosure without departing from the spirit or scope of the disclosure. Thus, it is intended that the present disclosure cover the modifications and variations of the disclosure provided they come within the scope of the appended claims and their equivalents.

What is claimed is:

1. A method of driving a display device including a display panel configured to display images; a first circuit board including a timing controller; a plurality of second circuit boards arranged along one side of the display panel; at least one first cable electrically connecting the first and second circuit boards; a plurality of third circuit boards arranged along the one side of the display panel and connecting the display panel to the plurality of second circuit boards; voltage lines extending on the third circuit boards, the second circuit boards and the at least one first cable and to transmit a voltage signal from the timing controller to the display panel for driving the display panel; a deviation compensation circuit; and a variable circuit, the method comprising:

sensing, via the deviation compensation circuit, sense a voltage transmitted through the voltage line on a first one of the plurality of second circuit boards and a voltage transmitted through the voltage line on a second one of the plurality of second circuit boards adjacent to the first one of the plurality of second circuit boards; and compensating, via the variable circuit, for a current difference between the first one and the second one of the plurality of second circuit boards, wherein the deviation compensation circuit is disposed on one of the first one and the second one of the plurality of second circuit boards.

2. The method of claim 1, wherein the compensating for the current difference comprises controlling at least one transistor or at least one resistor included in the variable circuit based on the signal.

3. The method of claim 2, wherein the compensating for the current difference comprises:

controlling the at least one resistor to vary resistance values of the voltage lines, or controlling the at least one transistor to vary an amount of current flowing through the voltage lines or to block the current flowing through the voltage lines.

4. A display device comprising:

a display panel configured to display images;

a first circuit board including a timing controller;

a plurality of second circuit boards arranged along one side of the display panel;

at least one first cable electrically connecting the first and second circuit boards;

a plurality of third circuit boards arranged along the one side of the display panel and connecting the display panel to the plurality of second circuit boards;

voltage lines extending on the third circuit boards, the second circuit boards and the at least one first cable and to transmit a voltage signal from the timing controller to the display panel for driving the display panel;

a deviation compensation circuit configured to sense a voltage transmitted through the voltage line on a first one of the plurality of second circuit boards and a voltage transmitted through the voltage line on a second one of the plurality of second circuit boards adjacent to the first one of the plurality of second circuit boards; and a variable circuit configured to compensate for a current difference between the first one and the second one of the plurality of second circuit boards, wherein the deviation compensation circuit is disposed on one of the first one and the second one of the plurality of second circuit boards.

5. The display device of claim 4, wherein the variable circuit includes at least one variable resistor configured to vary resistance values of the voltage lines.

6. The display device of claim 4, wherein the variable circuit includes at least one transistor configured to vary an amount of current flowing through the voltage lines.

7. The display device of claim 6, wherein the deviation compensation circuit outputs a signal for controlling an on/off duty ratio of the at least one transistor.

8. The display device of claim 4, wherein the variable circuit is disposed between voltage lines formed in a display area of the display panel.

9. The display device of claim 8, wherein the variable circuit includes at least one transistor configured to block a current flowing through the voltage lines formed in the display area of the display panel.

10. The display device of claim 9, wherein the deviation compensation circuit outputs a signal for controlling on/off of each of the at least one transistor.

11. The display device of claim 9, wherein the deviation compensation circuit outputs at least one signal for independently controlling on/off of the at least one transistor.

12. The display device of claim 4, wherein the variable circuit is disposed on at least one of the first and the second circuit boards.

13. The display device of claim 1, wherein the deviation compensation circuit includes:

a first input terminal connected to the voltage line disposed on the first one of the plurality of second circuit boards;

a second input terminal connected to the voltage line disposed on the second one of the plurality of second circuit boards; and an output terminal connected to the variable circuit.

* * * * *